April 12, 1932.  L. SAIVES  1,853,230
CLUTCH MECHANISM FOR MOTOR VEHICLES
Filed July 22, 1929
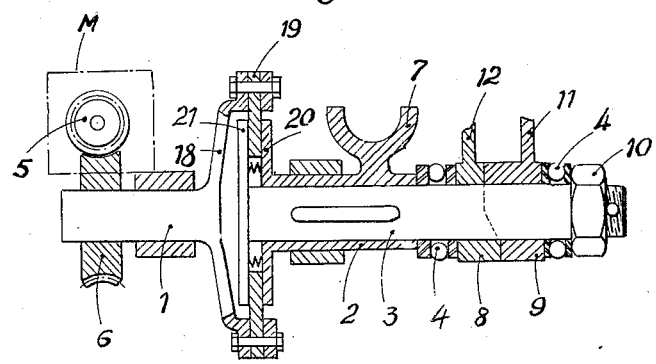
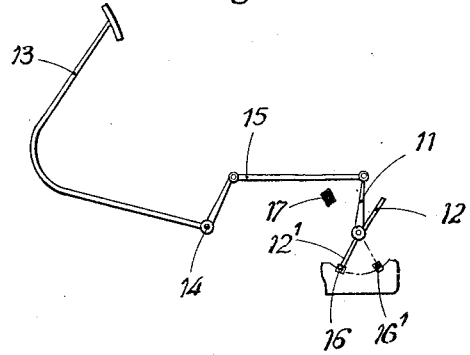
INVENTOR
LEON SAIVES.
By O'Neill & Bunn
ATTORNEYS Patented Apr. 12, 1932

1,853,230

UNITED STATES PATENT OFFICE

LEON SAIVES, OF BILLANCOURT, FRANCE, ASSIGNOR TO LOUIS RENAULT, OF BILLANCOURT, FRANCE

CLUTCH MECHANISM FOR MOTOR VEHICLES

Application filed July 22, 1929, Serial No. 380,093, and in France August 14, 1928.

The invention relates to the clutch apparatus used on vehicles to couple up the engine shaft to the drive. In certain automobiles, it may be desirable to interpose a declutching servo-motor, when the declutching operation requires a strong effort, due to the use of a very powerful spring maintaining the clutch surfaces in contact. The invention relates more particularly to a control comprising an electric motor, combined with a drive operating the clutch of the vehicle, wherein an auxiliary clutch is provided, which is brought into operation by the pedal or lever within reach of the driver.

In the preferred construction according to the invention an auxiliary shaft, suitably supported on the underframe of the vehicle, is divided into two parts, which can be coupled together by a plate clutch for example, one of the two parts being operated by the electric servo-motor, whilst the other part carries the declutching fork. A system of two disks, the contacting faces of which are provided with cam projections, are carried loose on this auxiliary shaft and are in connection respectively with the switch of the electric motor and with the control member, pedal or lever. When this control member is operated, it at first carries with it in its rotation the disk connected with the switch so as to close the circuit of the electric motor, and subsequently acts by means of the cams upon the auxiliary clutch so as to couple up the two parts of the shaft for operating the declutching fork.

Fig. 1 is a diagrammatic view partly in section of a clutch control apparatus in accordance with the invention.

Fig. 2 is a view of the connections given by way of example, of the control pedal with the switch.

On referring to the drawings it will be seen that a shaft 1 is located in line with a sleeve 2, through which passes the shaft 3; the shafts 1 and 3 and the sleeve 2 are suitably supported on the underframe of the vehicle or on one of its associated members.

The shaft 1 can be set in rotation by an electric motor through a suitable transmission comprising reduction gears 5 and 6. The sleeve 2 is provided with a fork 7 designed for declutching the vehicle or main clutch.

On the end of the shaft 3 projecting beyond the sleeve 2 disks 8 and 9 are mounted loose, having projecting cams on their opposed contacting faces. Thrust ball-bearings 4 are located upon the shaft 3 between the disk 8 and the sleeve 2 and between the disk 9 and a locknut 10 on the end of the shaft 3. The disk 9 is connected with a lever 11, which may be the lever of the clutch pedal or may be connected with said pedal. Similarly the disk 8 may have attached to it the lever 12 of the switch of the electric motor M or may be connected therewith. In the construction shown in Fig. 2, the pedal 13, pivoted at 14, operates the lever 11 by means of the connecting rod 15; the lever 12 is prolonged at 12′ and this part 12′ moves over the contacts 16, 16′ of the switch. A stop for the lever 12 is located at 17 so as to limit the movement of this lever.

The shaft 1 carries by means of arms 18 an auxiliary clutch plate or disk 19. This plate can be clamped between two plates 20 and 21 attached respectively to the ends of the sleeve 2 and of the shaft 3.

The operation of the apparatus is as follows:

For the driver the operation is the same as in the case of an ordinary control by a direct declutching pedal. When the driver wishes to declutch, he presses upon the pedal 13 and, through the intermediary of the rods shown in Fig. 2, the lever 11 and the disk 9 undergo an angular displacement. The disk 9, by the intermediary of its projecting cam, will carry with it in its angular displacement the disk 8 and the lever 12 until said lever abuts against the stop 17. The lever 12′ during this displacement will close the contacts necessary for starting up the electric motor M. From and after the moment when the lever 12 abuts against the stop 17 any new displacement of the pedal communicates to the disk 8 and consequently to the sleeve 2 a longitudinal sliding movement on the shaft 3 so as to cause the engagement of the plates 19, 20 and 21. Clutching is thus ensured between the shaft 1 and the sleeve 2. The electric motor, which has been started up as aforesaid, therefore causes the sleeve 2 to rotate as well as the fork 7, which acts upon the main clutch itself.

The declutching having been done, the electric motor continues to rotate keeping up the declutching, slippage between members 20, 21 and 19 taking place as soon as the desired degree of declutching is accomplished.

I claim:

1. Clutch mechanism for vehicles comprising, in combination with an electric motor and a driven shaft, two contacting disks mounted on said shaft and provided with inter-engaging cams, a clutch pedal, electrical contacts in circuit with the motor, link mechanism connected to the pedal whereby a movement of the latter may open or close said contacts, an auxiliary plate clutch, and connections whereby movement of one of said inter-engaging cams with respect to the other will actuate the plate clutch.

2. Declutching apparatus for motor vehicles comprising, in combination with an electric motor, a shaft driven thereby, a second shaft having a declutching fork mounted thereon, two opposed disks carried by said second shaft and having contacting faces provided with interengaging cams, a pedal connected with one of said disks for moving the same, electrical contacts in circuit with the motor operated by the movement of one of said disks, and an auxiliary clutch for connecting said shafts, whereby the movement of the pedal will open or close the contacts and actuate said auxiliary clutch to operative or inoperative position.

3. Clutch or the like operating mechanism for motor vehicles including, in combination with an electric motor, a shaft to be driven thereby, manually operable mechanism journaled on said shaft, means for starting said motor when said manually operable mechanism is actuated, means on said shaft for operating the vehicle clutch or the like when said shaft is rotated, and a clutch permitting slippage associated with the drive of said shaft by the electric motor when the vehicle clutch or the like has been actuated.

4. Clutch or the like operating mechanism for motor vehicles including, in combination with an electric motor, a shaft to be driven thereby, manually operable mechanism journaled on said shaft, means for starting said motor when said manually operable mechanism is actuated, means on said shaft for operating the vehicle clutch or the like when said shaft is rotated, a clutch permitting slippage associated with the drive of said shaft by the electric motor when the vehicle clutch or the like has been actuated, and means associated with said manually operable mechanism for operating said clutch whereby the slippage thereof will vary according to the amount said manually operable mechanism is operated to actuate the vehicle clutch or the like the desired amount.

In testimony whereof he has signed this specification.

LEON SAIVES.